United States Patent
Dupuy et al.

(10) Patent No.: US 12,170,726 B2
(45) Date of Patent: Dec. 17, 2024

(54) PRE-PERSONALIZED SECURE ELEMENT AND EMBEDDED PERSONALIZATION

(71) Applicant: Idemia France, Courbevoie (FR)

(72) Inventors: Maxyme Dupuy, Courbevoie (FR); Dominique Cardoso, Courbevoie (FR); Tomasz Wozniak, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 211 days.

(21) Appl. No.: 17/814,720

(22) Filed: Jul. 25, 2022

(65) Prior Publication Data

US 2023/0030478 A1    Feb. 2, 2023

(30) Foreign Application Priority Data

Jul. 30, 2021  (FR) ...................................... 2108327

(51) Int. Cl.
*H04L 9/08*    (2006.01)
*G06F 8/61*    (2018.01)
*G06F 21/60*   (2013.01)

(52) U.S. Cl.
CPC .............. *H04L 9/0861* (2013.01); *G06F 8/61* (2013.01); *G06F 21/602* (2013.01)

(58) Field of Classification Search
CPC ..... H04L 9/08961; G06F 8/671; G06F 21/602
USPC ........................................................ 713/193
See application file for complete search history.

(56) References Cited

U.S. PATENT DOCUMENTS

| | | |
|---|---|---|
| 2015/0365231 A1 | 12/2015 | Warnez et al. |
| 2017/0374063 A1* | 12/2017 | Wimböck ............. H04W 12/04 |
| 2019/0044715 A1* | 2/2019 | Hunacek ............... H04L 9/0866 |
| 2019/0197525 A1 | 6/2019 | Biehlmann |
| 2020/0242274 A1* | 7/2020 | Pan ........................... G07G 1/14 |
| 2023/0171100 A1* | 6/2023 | Eckardt ................... H04L 9/085 713/171 |

OTHER PUBLICATIONS

FR Search Report and Written Opinion issued in FR Patent Application No. 2108327 dated Apr. 27, 2022.

* cited by examiner

*Primary Examiner* — Michael S McNally
(74) *Attorney, Agent, or Firm* — NIXON & VANDERHYE (57) ABSTRACT

A method for personalizing embedded secure elements, eSE, allows for simplified manufacturing before being integrated into host devices. An eSE implements services executed by an embedded operating system, OS, whereupon it is loaded into the eSE. The non-personalized eSE comprises an OS loader and a master cryptographic key common to a plurality of secure elements. It can therefore be produced in large numbers. The OS loader obtains an operating system package from a server and installs it. In response to the installation, the OS loader generates a derivation cryptographic key by diversifying the master cryptographic key, and then the OS generates personalized data by deriving pre-personalization data with the derivation key. The eSE, deployed in the field in a simple non-personalized state, is fully personalized without exchanging secret personalized data.

10 Claims, 3 Drawing Sheets

PRE-PERSONALIZED SECURE ELEMENT AND EMBEDDED PERSONALIZATION

CROSS-REFERENCE TO RELATED APPLICATIONS

This application claims priority pursuant to 35 U.S.C. 119(a) to France Patent Application No. 2108327, filed Jul. 30, 2021, which application is incorporated herein by reference in its entirety.

TECHNICAL FIELD

The present invention relates to the field of secure elements.

A secure element, SE, is a tamper-proof hardware component or platform (typically a chip or smart card) used in a host terminal (typically a mobile terminal) and capable of securely hosting under the control of a card operating system, OS, (that is, a low-level OS or "firmware") applications and data in accordance with security rules and requirements set by trusted authorities.

A widely used form factor of the SE is the integrated or embedded secure element, eSE. This embedded secure element is generally soldered to the host terminal.

The secure elements are programmed according to the desired applications.

By way of example, an eSE can form the secure element necessary for many uses or services based on an NFC (acronym of "Near Field Communication") implemented by a host mobile terminal. For example, an NFC payment service requires the secret banking information of the user that is advantageously stored in the eSE, protected from any unauthorized access. This is also the case for a public transport service where the eSE makes it possible to identify the user at ticket barriers.

Another example of a secure element is the embedded UICC (acronym of "Universal Integrated Circuit Card") that provides the references of a subscriber to be authenticated on a mobile telephone network. This involves, for example, an eSE configured as a SIM (acronym of "Subscriber Identity Module") card. This is known as eUICC (acronym of "embedded Universal Integrated Circuit Card").

The secure elements are manufactured and then personalized, that is, loaded with SE and subscriber-specific data. Some data must be kept secret for security reasons, such as credentials, cryptographic keys, or identification data. Other SE-specific data may be less confidential. Also, during the personalization of a group of SEs, secret data is generally diversified from a secret data, for example, a derivation cryptographic key, so that each SE has its own specific secret data, for example, cryptographic keys and credentials.

In particular, personalization is a process consisting of loading on each SE, its operating system (or OS) and various data.

For reasons of optimization of the personalization process, the process is broken down into two distinct processes: pre-personalization and personalization. Pre-personalization consists of loading, in the SE, data common to all the SEs of a same batch. Also, the entire batch of SEs can be pre-personalized using the same operation. This common part includes in particular loading in memory the operating system and the pre-personalized data, also called static data. Personalization is implemented after pre-personalization, and consists of loading into the SE, data that is specific to it, also called dynamic data, including personalized secret data (keys, credentials, etc.).

It should be noted that the term "personalization" is generally understood to be that commonly used by the skilled person in the microcircuit card industry, or as defined by W. Ranki and W. Effing in "Smart Card Handbook, Second Edition, Ed. John Wiley & Sans, Ltd" as follows: "The term personalization, in its broadest sense, means that data specific to a card or to an individual is entered into the card. This data can for example be a name, an address, but also keys associated to the card. The only thing that matters is that this data is specific to this card."

By extension, the pre-personalization of SEs consists of similar operations except that the data entered into the SEs is common to a batch of SEs or to a type of entity (for example smart cards). This involves, for example, configuration data of programs contained in a rewritable non-volatile memory (for example, Flash, EEPROM or another type) that aim to determine a common behavior or operation of all these SEs of the same batch or entity type.

Nowadays, SEs are personalized outside the manufacturing site. For example, the personalization can be implemented in a third-party site.

Personalization sites must therefore set up personalization systems according to strict procedures and respecting security requirements, in particular with regard to the secret personalized data handled. It should be noted that sending personalization data to the personalization site also requires compliance with very strict security requirements, in particular the establishment of a secure link (transport key, session key) between the personalization system and the SEs.

Additionally, the personalization operation is specific to each SE, requiring as a result separate operations for each SE before or after its physical integration (soldering for an eSE) to a host device.

Also, the existing procedures for personalizing SEs are complex (in terms of time and security, in particular) and therefore costly.

There is therefore a need to improve this situation.

SUMMARY OF THE INVENTION

For this purpose, the present invention aims to optimize the personalization of secure elements.

It proposes generating (by diversification or "rotation"), within the SE itself and upon loading a new operating system, the derivation key used for the personalization of the SE and thus allow the derivation of personalization data also within the SE from pre-personalized data.

In this way, batches of similar SEs can be manufactured and sold without any dedicated personalization operation before their sale. As these SEs only include common data and therefore no pre-personalization, their production in large numbers is simple.

Moreover, the personalization of SEs can then be carried out later in the field, remotely, thus reducing the time from the production phase to the sale.

Last but not least, the invention improves the security of the SEs. On the one hand, no secret personalized data is now transferred directly to the SE and therefore is not susceptible of being intercepted. This eliminates the need for a highly secure personalization site. On the other hand, by virtue of the in-situ diversification of the derivation key used for personalization, it is possible to repeat such diversification during the life of the card, reducing as a result the risks of compromise.

To this end, the present invention provides a secure element configured to be integrated into a host device and to implement services executed by an operating system whereupon the operating system is loaded into the secure element, the secure element including an operating system loader and at least one master cryptographic key. This key is initially common to a plurality of secure elements. In particular, the operating system loader and the cryptographic key (and optionally any other common pre-personalization data) are loaded into the secure element during its manufacture, before or after being integrated into the host device.

According to the invention, the secure element is configured to:
obtain, from a server, an operating system package and install the operating system,
in response to the installation of the operating system, causing the operating system loader to generate a derivation (cryptographic) key by diversifying the master cryptographic key.

Thus, the presence of the operating system loader (or firmware loader) in the secure element eSE at the time of manufacture makes it possible to load an operating system at any time, whether it is the first operating system loaded into the eSE or an update version, and to generate locally ("on board") the derivation key in order to enable the operating system to generate (derive) its own personalized data. Such personalized data, specific to the operating system and/or to the embedded secure element, give, for example, completely secure access to services of the operating system or external services, for example of a telecommunication or banking network (e.g., telephone calls, data services, authentication with a server, etc.).

Such a secure element presents the benefit of not being personalized when it is integrated into the host device. Identical secure elements can, therefore, be manufactured in large numbers, while allowing remote embedded personalization in the field.

Also, according to some embodiments, the operating system package comprises pre-personalization data, optionally associated with the operating system, and
the secure element is configured to generate personalized data by deriving the pre-personalization data with the derivation key.

By virtue of this derivation, the secure element becomes personalized.

It should be noted that pre-personalization data may also be loaded initially with the operating system loader and used during this diversification for personalization. Similarly, personalized data may also be loaded concurrently with the operating system loading.

In one embodiment, the operating system loader is configured to generate the derivation key from the master cryptographic key, a unique identifier of the operating system loader, a unique identifier of the operating system package or the loaded and installed operating system, and a derivation counter updated at each generation of the derivation key. Optionally, a random or one-time password (OTP) known to the server, or to another server can be added as a diversification parameter to the master cryptographic key.

This configuration allows for secure personalization of the derivation key, different from one secure element to another and different from one diversification to another within the same eSE.

The diversification can be carried out directly from the initial master cryptographic key or from the previous derivation key obtained (which becomes the new master key for the next generation). In the latter case, it may be considered to overwrite the old derivation key (initially the master or root key) with the new derivation key.

Whereupon the secure element is manufactured, and before an operating system is loaded, the derivation counter presents an initial value, for example zero. The derivation counter value is incremented as new versions of the operating system are obtained and installed, and as new derivation keys are generated.

According to a characteristic, the secure element, is further configured to, after generating the derivation key, send to a server the unique identifier of the operating system loader, the unique identifier of the operating system package or the loaded and installed operating system, the derivation counter, and optionally a label designating the master cryptographic key. In other words, it transmits the set of parameters used (the possible random or OTP is already known by the server) for the generation. The key label is particularly transmitted in the case wherein a plurality of keys is stored in the secure element, in order to identify the key employed for diversification and then for generating the personalized data.

In this way, the server can generate on its own the eSE-specific derivation key for the embedded operating system, and thus also generate the eSE-specific personalized data without secret data being exchanged. It therefore has the same mirror-like personalized and secret data as the eSE. Such a server is then able to carry out secure operations of identification, authentication, etc. with the secure element.

In one embodiment, the secure element is configured to send, to the server, a request for obtaining the operating system package, the request comprising a unique identifier of the operating system loader and a unique identifier of an operating system package or a previously installed operating system if any, and the obtainment of the operating system package is in response to the request.

Each batch of secure elements is provided with a common operating system loader and a master key, and in a unique way to each eSE, a unique loader identifier. Thus, identical eSEs can be personalized in a distinct and targeted way.

According to a characteristic, the secure element is configured to generate the derivation key in response to an operating system installation completion event.

As a variant, the secure element is configured to generate the derivation key in response to a first boot of the installed operating system.

Also, at each new loading of an operating system (for example, upgrade) a new derivation key is generated. Incidentally, new personalized data are also generated, by derivation from this new key.

According to a characteristic, the secure element comprises a flag set to a first non-diverse state value upon the installation of the operating system and to a second diverse state value upon the generation of the derivation key. In this way, this flag allows the secure element to know if the generation of the derivation key has already taken place. This is particularly useful to identify the first boot of the operating system and thus avoid unintentional generations at each reboot of the operating system. Optionally, the flag can be set to a third personalized state value, when generating the personalized data.

According to a characteristic, the master cryptographic key is stored in a secure memory and is accessible by the operating system loader only. Also, the parameters received by the loader to generate the derivation key only comprise a label (or identifier) of the master cryptographic key to be used (for example in the case where multiple master keys are stored) for generation, and not the key itself. This increases security.

Correlatively, the invention also proposes a method for personalizing a secure element configured to be integrated into a host device and to implement services executed by an operating system whereupon the operating system is loaded into the secure element, the secure element including an operating system loader and at least one master cryptographic key (initially, common to a plurality of secure elements), said method including the following steps:
- obtaining, from a server, an operating system package and installing the operating system,
- in response to the installation of the operating system, causing the operating system loader to generate a derivation key by diversifying the master cryptographic key.

The generation method presents features and benefits analogous to those previously described in relation to the integrated circuit.

The method may further incorporate optional steps or features set forth herein before in connection with device (secure element) features.

BRIEF DESCRIPTION OF THE DRAWINGS

Other particular features and advantages of the invention will become more apparent in the following description, illustrated by the appended figures which depict examples of non-limiting embodiments.

DETAILED DESCRIPTION

The invention proposes a new scenario for personalizing embedded secure elements (eSEs) that enables simpler and faster manufacturing of eSEs before being integrated into their host devices. An eSE implements services executed by an embedded operating system ("or firmware") whereupon the operating system is loaded into the secure element. By way of example, such services include identification or authentication with an operator or banking network or wireless telecommunication or with a reader to carry out a transaction (financial or banking, for example), access verification services to functions or services (for example, access code verification), data or message confidentiality services (data integrity and/or confidentiality), non-repudiation services and so on.

According to the invention, such an eSE intended to be integrated into a host device comprises an operating system loader (OS or firmware loader) and at least one master cryptographic key common to a plurality of secure elements. Such an eSE is not personalized at this stage, thus allowing its identical production in large numbers. Optionally, pre-personalized data can also be loaded into the eSE during its manufacture (that is, before being integrated into the host device). Similarly, some already personalized data can also be loaded at this stage. The pre-personalized and personalized data can cover any type of data, including application data (for the operation of applications) and security data (for operations preventing fraudulent use of the secure element), such as cryptographic keys or "keysets".

The OS or firmware loader is a minimal piece of programming that allows performing some basic functions on the secure element, such as executing a script, loading an OS and associated data, installing an OS and associated data, calculating key values, etc.

The expression "pre-personalized data" or "static data" is understood to mean any data common to a batch of secure elements, for example, an operating system, a common cryptographic key, an operating system loader, a set of authentication keys dedicated to securing communications with one or more third-party servers (secure channel), counter initialization data and/or values, key identification label data and/or values, etc.

The expression "personalized data" or "dynamic data" is understood to mean any data specific to a secure element (and thus indirectly to a user or subscriber or a device including the secure element), for example, a diversification or identification key, user or subscriber data, a specific register or file value, credentials, operator data (for example, server addresses of the operator's network), applications or user personal identification numbers, PINs, application data values, etc. Personalized data can be derived from some pre-personalized data. The derivation can be a cryptographic key diversification or more generally a mathematical calculation on pre-personalized data.

The OS loader, and more generally the secure element, is configured to obtain, from a remote server (for example, the server of a telephone or banking operator, or from the manufacturer or manager of the secure element), an operating system package and to install the operating system in the secure element. OS loading and installation mechanisms are widely known and therefore not detailed herein. An operating system package is understood in the computer sense, namely a set of software and files provided together, for example, in the form of a single computer structure (file or archive). In some embodiments, an operating system package may be reduced to just one operating system.

Moreover, the secure element is intended, in response to the installation of the operating system, to cause the operating system loader to generate a derivation (cryptographic) key by diversifying the master cryptographic key.

The loader can indeed be designed to be able to access the secure memory storing the secret data, such as the master cryptographic key.

The derivation key, once generated, then allows the secure element to generate personalized data by deriving pre-personalization data (present in the eSE) with the derivation key. As a variant, personalization data (for example, personalized keys) can be generated directly from the single derivation key.

These operations (OS loading, personalized data diversification and derivation) can take place while the secure element is already integrated in its host device, that is, in the field. This eliminates the need to use a personalization site.

Figure 1:
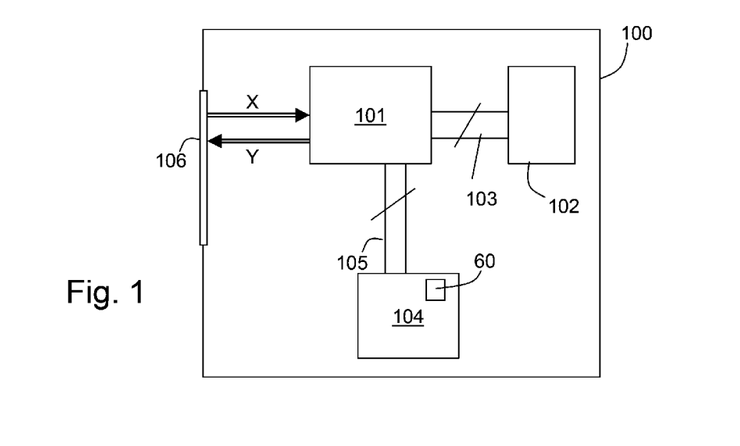
FIG. 1 schematically depicts a secure element in which the present invention can be implemented.

FIG. 1 schematically depicts a secure element 100 in which the present invention is implemented. This secure element 100 comprises a microprocessor 101, with which is associated on the one hand one or more random access memories 102, for example, by means of a bus 103, and on the other hand one or more non-volatile memories 104 (for example, of the ROM and/or EEPROM and/or flash type), for example, through a bus 105. The non-volatile storage memory 104 stores data and software (loader, operating system, and other applications) intended to implement the invention but also any data necessary for executing the programs. The volatile working memory 102 stores the executable code of the computer programs, as well as registers suitable for storing variables and parameters necessary for their execution.

The buses 103 and 105 may be one and the same bus. The microprocessor 101 may be a secure cryptoprocessor.

The secure element 100 further includes, connected to the bus(es), one or more communication interfaces 106 with the host device embedding the secure element, typically implementing APDU-type commands.

The secure element 100 may be an eSE ("embedded SE"), an eUICC ("embedded Universal Integrated Circuit Card"), an eSIM ("embedded SIM"), intended to be integrated, by soldering, for example, into a host device such as a smartphone, a digital tablet, a laptop, a personal assistant, an entertainment device (e.g., game console).

Figure 2A:
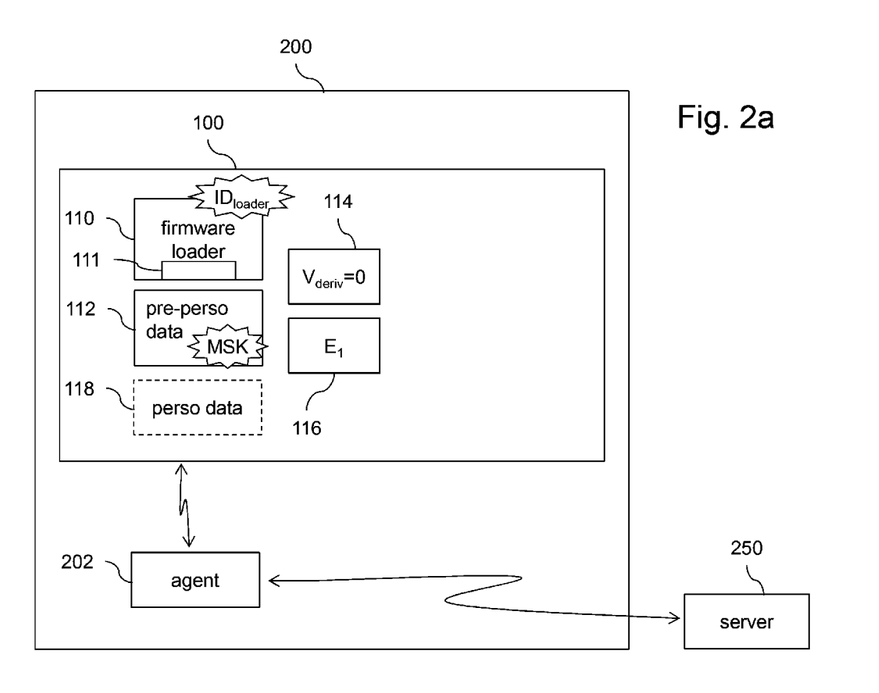
FIG. 2a illustrates a secure element leaving a manufacturing process whereupon it is integrated into a host device.
Figure 2B:
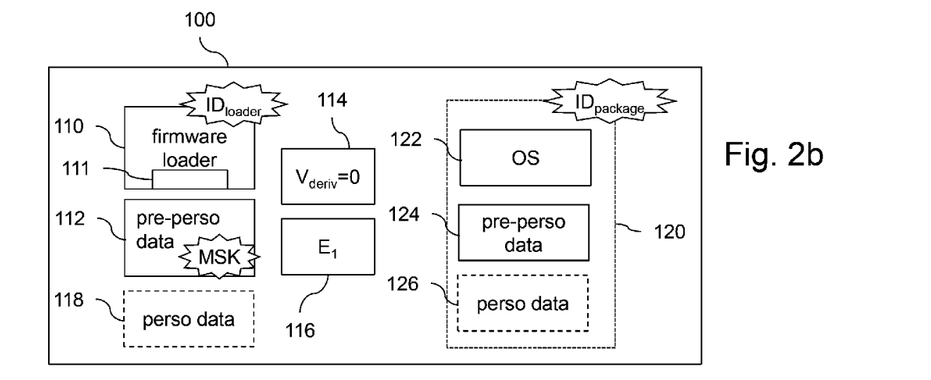
FIG. 2b illustrates the secure element after installing a new operating system package.
Figure 2C:
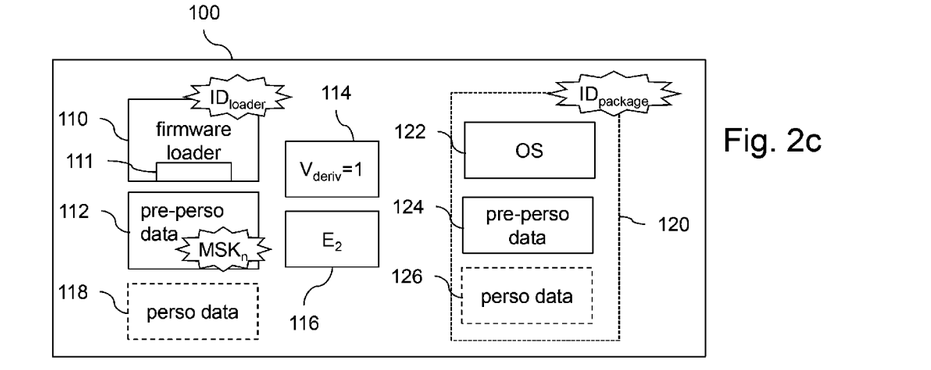
FIG. 2c illustrates the secure element after diversification of the master key to obtain a derivation key.
Figure 3:
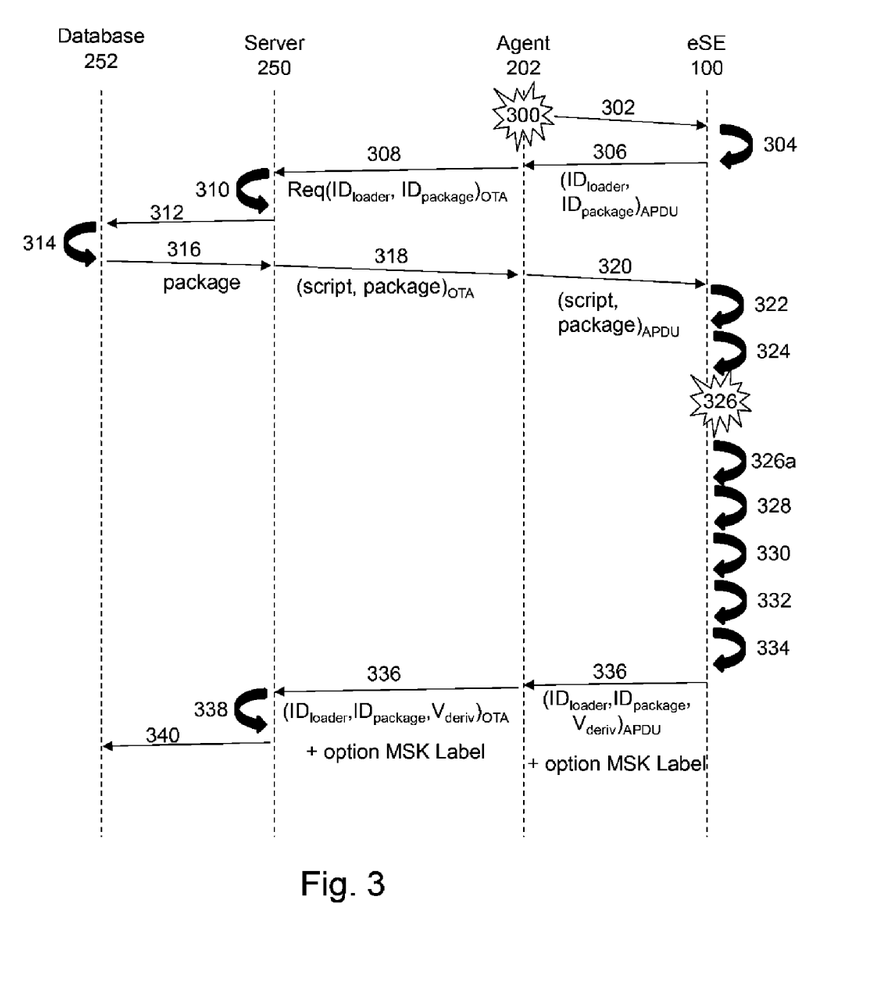
FIG. 3 schematically illustrates various steps for personalizing a secure element according to embodiments of the invention.

FIGS. 2a, 2b, 2c schematically illustrate a functional structure of the secure element 100 according to different states in a personalization process of the secure element. FIG. 3 schematically illustrates various steps for personalizing a secure element according to embodiments of the invention.

FIG. 2a illustrates a secure element 100 leaving a plant, that is, after a manufacturing process whereupon it is integrated into a host device 200. Advantageously, a batch of secure elements identical to the one in FIG. 2a can be manufactured and then integrated into a fleet of host devices because these secure elements are preferably not personalized yet at this stage. Nevertheless, in some embodiments, it may be provided that already during the manufacturing process, personalized data is loaded into the memory of the secure element 100.

The secure element 100 leaving the manufacturing site includes, in a non-volatile memory 104, a card operating system loader 110 and pre-personalized data 112 including, in particular, one or more secret data such as a master or root cryptographic key, MSK, of numeric or alphanumeric type. In particular, the secret data is stored in a protected sector (from a security point of view) of the non-volatile memory, for example, by means of a dedicated security domain (for example, ISD (acronym of "Issuer Security Domain") according to the document, Global Platform Card Specification version 2.3). In a variant, each secret data, typically the key MSK, is stored in a computer object associated with the loader 110. This computer object can be protected by confidentiality and integrity encryption. It is preferably stored in a partition of the non-volatile memory associated with the loader 110. These different configurations ensure secure access to the key MSK (and generally to the secret data) by the loader 110 only.

The loader 110 can directly manipulate these objects or be provided with an API interface 111 allowing access to the security domain and thus to the secret data using labels (or identifiers or tags or pointers or an equivalent) identifying each of the secret data separately. In the following, the label identifying the master key MSK is called the "MSK label". By way of example, the MSK label can be the object identifier assigned to the computer object created and instantiated to store the key MSK.

The card operating system loader 110 is identified using a unique identifier $ID_{loader}$ that is different from one secure element to another. This identifier can be considered as a serial number of the secure element 100. The primary function of the loader is to obtain and execute in memory 104 package installation scripts of the secure element. The loader 110 may be provided with session or transport keys (optionally unique or common to a batch of eSEs) to allow secure remote communication with an external server.

In addition, a derivation counter 114 is provided in non-volatile (rewritable) memory, which counter is initialized to an initialization value (for example, 0) and is incremented at each diversification of the master key MSK by the loader 110. The increment can be done in steps of 1 or another positive integer. Key diversification is an operation known to the skilled person that generates one or more secret keys from an initial secret value (the master key MSK).

If multiple secret keys are stored, multiple derivation counters 114 may be provided, each associated with one of the secret keys to account for their diversifications.

An SE state flag 116 is also provided in rewritable non-volatile memory to track the personalization state of the secure element. This flag is initially set to a first value of non-diversified state $E_1$ (for example, 0). This flag is intended to change its value and thus pass to a second diversified state value $E_2$ (for example, 1) when the master key MSK is diversified into a derivation key for the personalization of the operating system (and thus of the secure element). The flag can be reset to the first state value $E_1$ when a new operating system is installed (including, for example, an OS update). Optionally, the flag can be set to a third personalized state value $E_3$, when generating the personalized data.

In this way, this flag allows the secure element to know if the generation of the derivation key has already taken place and/or if that of the personalized data has also taken place. This is particularly useful to identify the first boot of the operating system and thus avoid unintentional generations at each reboot of the operating system.

As shown in the figure, other data 118, in particular, those already personalized can also be optionally loaded into the eSE 100.

In particular, the communication interface 106 of the secure element enables communication (for example, using APDU commands) with an agent 202 running in the host device 200. Such an agent may communicate with the exterior of the host device 200 using appropriate communication interfaces (typically, wireless communication modules). By way of example, it may involve an agent specific to an operator (telephone, banking, automobile, etc.), which is configured to connect to an infrastructure 250 of the operator composed of one or more servers connected to each other, which are hereafter referred to as "server" (in the singular form).

This operator infrastructure 250 manages a fleet of eSEs in the field (that is, embedded into the host devices) by storing, in a dedicated database 252 (shown in FIG. 3), an image of each of the eSEs (thus associated with each $ID_{loader}$) in the field in order to carry out efficiently and securely operations with them. This image can, for example, include a copy of the secret data of the eSEs, the operating systems and software installed. Also, in the case of a personalization carried out in the field as contemplated by the invention, this "image" of the eSEs must also evolve to reflect that personalization, without the personalized data being exchanged and thus subject to the risk of being intercepted. The database 252 thus initially comprises a copy of the master key MSK.

With reference to FIG. 3, an event 300 triggers an initial personalization process according to the invention. This event may be the first power up of the host device 200 or the eSE 100 (thus corresponding to a first use of the eSE). As a variant, it may also involve a voluntary action by a user in a menu of the host device 200. In another variant, it may involve the detection of the absence of an OS in the eSE 100 or the availability of an OS update on the server 250. Another variant can be the expiration of a timeout for a periodic OS availability or OS update query.

Herein, it is the agent 202 of the host device 200 that drives the personalization of the eSE 100. In step 302, the agent 202 sends a request, for example, an APDU, to the eSE 100 for the purpose of obtaining the identifier $ID_{loader}$, as well as an operating system package identifier $ID_{package}$ already installed in the eSE.

In the state shown in FIG. 2a no operating system has been installed yet. A NULL value can then be used as $ID_{package}$ to indicate this state.

Generally speaking, the identifier $ID_{package}$ can otherwise follow different formats according to different embodiments:
- an identifier linked to the OS only: $ID_{package}$=version of the OS,
- an identifier linked to the OS and to the data accompanying the OS whether pre-personalized and/or personalized. For example, $ID_{package}$=version of the installed package {OS, data}, or $ID_{package}$=version of the installed package {OS, pre-perso data}||version of the loaded personalized data, with "||" being the concatenation operator,
- an identifier linked to the OS and an identifier linked to the data accompanying the OS (pre-perso and/or perso). For example, $ID_{package}$=version of the OS|| version of loaded data, or $ID_{package}$=version of the OS|| version of loaded pre-personalized data|| version of loaded personalized data.

In response to the request, the eSE 100 (the loader 110) retrieves the two requested identifiers at step 304 and sends them back to the agent 202 at step 306.

In step 308, the agent 202 transmits a request to obtain an operating system package to the server 250 in a conventional manner, for example via HTTPS or OTA (acronym of "Over-The-Air"). The request includes the two identifiers $ID_{loader}$ and $ID_{package}$. A periodic query for OS availability or OS updates can also be considered as such an obtainment request.

Upon receiving the request, the server 250 extracts (step 310) the two identifiers, and based on them, checks (step 312) for the availability of a new operating system package version. Depending on the format of the identifier $ID_{package}$, it may involve checking if a new OS is available and/or if new pre-personalized data (static data) is available and/or if new personalized data (dynamic data) is available.

This verification may consist of a query in the database 252 to verify the package associated with the $ID_{loader}$. If it is different from the package carrying the identifier $ID_{package}$, then a new package must be installed.

This verification can be done separately for the OS and the pre-personalized and/or personalized data according to the identifier $ID_{package}$ format. In this case, the elements (OS and/or data) identified as new are compiled into a new unique package (the one to be installed).

In step 314, the new elements (OS, data) to be installed are identified in the database 252, then retrieved (step 316) by the server 250.

At step 318, the new operating system package is formed: installation script and elements (operating system, optionally only an update and/or pre-personalized data and/or already personalized data), and then sent back by the server 250 to the agent 202 in response to the request 308.

At step 320, the eSE receives said new package from the agent 252, typically via APDU.

If no OS is already installed on the eSE 100, it is the OS loader 110 that receives the package to execute the installation script. If an OS is already installed, it is the active OS itself that receives the package (OS update) for the execution of the installation script.

After checking the integrity of the received package, the OS loader 110 or the active OS loads in a working memory (RAM memory 102) the installation script and the contents of the package (new OS and related data) and then installs the set in a non-volatile memory 104 in step 322 by executing the installation script.

At the end of the installation, the diversification state flag 116 is set to 0 (state $E_1$) (step 324) to indicate that a diversification is required after this new installation. Optionally, a verification of the integrity of the installed OS can be performed, in order to proceed with the method only in case of confirmed integrity.

FIG. 2b illustrates the secure element 100 after installing a new operating system package. As depicted in the figure, the installation leads to the presence, in a non-volatile memory 104, of the package 120 identified by the identifier $ID_{package}$. The installed package 120 includes, for example, a new OS 122, new pre-personalized data 124 associated with the OS, and optionally new personalized data 126.

At this point, if optionally some personalized data 118, 126 may be present, the eSE 100 is still in a non-diversified state (flag 116 at 0, i.e., state $E_1$) in view of the diversification of the master key MSK. Incidentally, state $E_1$ also indicates non-personalization of the ES in view of the derivation of personalized data from pre-personalized data 112, 124 and/or the derivation key (not yet generated at this stage).

Back to FIG. 3, the personalization of the secure element using the master key MSK is triggered by event 326. As a reminder, this personalization includes two phases: the diversification of the master key MSK into a derivation key, and then the derivation of personalized data from this derivation key.

In one embodiment, event 326 is an operating system installation completion event (steps 322, 324). This event may simply consist of the detection of a last command of the script, for example, via a particular end-of-script field in its header or simply because the last script command is previously known. As a variant, a particular life cycle state change of the SE can be detected that corresponds to an end of installation.

In a variant, the event 326 is the detection of a first boot of the newly installed operating system 122. In this case, to identify such a first boot, the eSE 110 checks at step 326a that the flag 116 is indeed at the first non-diversified state value $E_1$ (that is to say, 0).

If so, (event detected and optionally flag 116 is at $E_1$), the eSE 100 initiates the diversification 328 of the master cryptographic key to generate a derivative (cryptographic) key.

This diversification operation is controlled by the loader 110.

Also, if the loader 110 directly detects the event 326 (in particular, if it installs the package 120 itself for the first time), then it directly engages the diversification operation 328. If the OS 122 detects the event 326 (and optionally 326a), then it calls a service of the loader 110, typically the API 111, to have the loader initiate the diversification operation 328. As a variant, the loader 110 may also use the API 111 to carry out the diversification operation 328 if it does not have direct access to the key MSK.

The loader 110 increments the derivation counter 114 for the purpose of this operation, and then retrieves the following parameters (optionally partially received from the OS 122 when the latter initiates the diversification) to control the API 111: the identifier $ID_{loader}$, the identifier $ID_{package}$, of the loaded and installed operating system, and the current value $V_{deriv}$ of the derivation counter 114. If there is more than one secret data or master key in the memory of the secure element, the MSK label designating the master cryptographic key MSK to be used can also be retrieved to select the appropriate key MSK.

In step 328, a new derivation key is generated from these parameters, using, for example, a state-of-the-art diversification formula.

The new derivation key can overwrite, in secure memory 104 (non-volatile rewritable), the key MSK and thus become the new master key MSK still identified by the MSK label.

As a variant, the new derivation key can be stored in the secure memory next to the original key MSK. In this case, a dedicated key label (identifying the derivation key) may be obtained by the loader 110 or API 111, typically an identifier assigned to the computer object created to store the new derivation key. As a variant, the loader or API can internally maintain the same label for the key MSK to designate the last derivation key generated.

The key MSK diversification is also known as "rotation" of the key MSK value. Rotation or diversification of the key MSK value must be understood to mean the fact of calculating (generating, modifying, updating) a new key MSK value and storing it in a rewritable non-volatile memory 104 such as flash, EEPROM or other.

At the end of step 328, flag 116 is set to state $E_2$ indicating a diversified (derivation key generated) but not personalized state of the secure element 100. This intermediate state allows the secure element, in case of reboot, to know if the following personalization operations should be executed.

FIG. 2c illustrates the secure element 100 after diversification of the master key to obtain a derivation key, denoted $MSK_n$. Again, it is noted that the eSE personalization is not complete, with flag 116 being in the state $E_2$. With respect to the state in FIG. 2b, the counter 114 has been updated and the new derivation key $MSK_n$ has overwritten the old master key MSK or is stored in addition.

Returning to FIG. 3, the optional step 330 consists in rebooting the OS 122, particularly if the event 326 is not such a reboot. During this reboot, the state of flag 116 can be checked, and the following steps executed only if the state is $E_2$.

This reboot 330 or completion of the diversification operation 328 triggers the personalized data generation step 332.

This generation may involve deriving this personalized data from the pre-personalized data 112 and/or 124 in memory using the derivation key $MSK_n$. This involves deriving specific (dynamic or personalized) data for the operation of the secure element 100 from the pre-personalized data 112, 124. As mentioned herein before, this specific data can include credentials, cryptographic keys, subscriber data or profiles, operator data (for example, server addresses of the operator's network), applications or user personal identification numbers, PINs, application data values, etc.

As a variant or in combination, personalized data, for example, new personalized cryptographic keys, can be generated by means of a new diversification directly from the derivation key $MSK_n$, without using any other pre-personalized data. Herein, this involves simply diversifying the derivation key in order to obtain one or more personal cryptographic keys, i.e., specific to the secure element.

The OS 122 may, for example, call the API 111 of the loader 110 to have it initiate the personal data generation operation 332.

It is this personalization operation of the eSE 100 that allows saving time compared to known techniques, because it is carried out in the field, without a personalization phase on a dedicated site.

Once the personalization operation 332 is performed, flag 116 is set (step 334) to the state $E_3$ indicating a personalized state of the eSE 100.

Figure 2D:
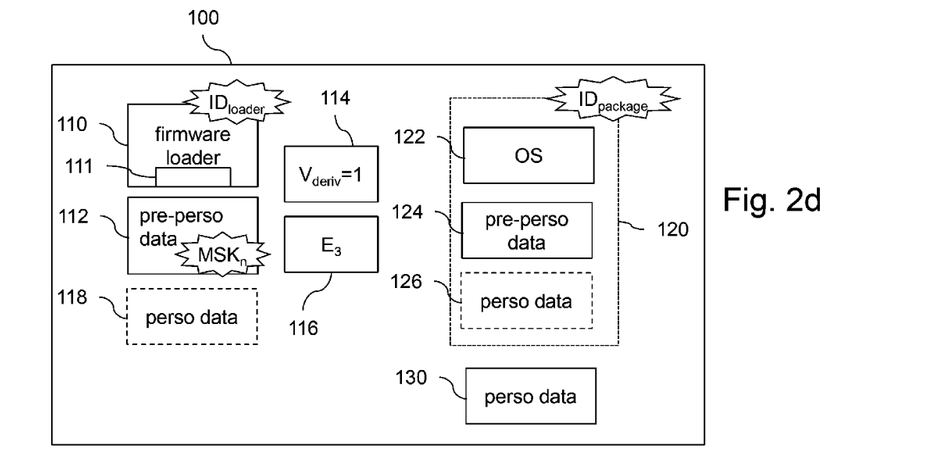
FIG. 2d illustrates the secure element after a personalization data generation operation of personalized data by derivation from the derivation key.

FIG. 2d illustrates the secure element 100 after this personalization data generation operation of the personalized data by derivation from the derivation key. The eSE 100 thus includes new personalized data 130 resulting from this derivation. Additionally, flag 116 is now set to $E_3$ value.

Optionally, the pre-personalized data 124 having been employed for this derivation can be deleted if it is no longer useful.

Back to FIG. 3, once the eSE 100 has been personalized, the latter sends a personalization completion message to the server 250 in step 336. This is sent via the agent 202, and the message includes the parameters used for the diversification 328, namely the identifier $ID_{loader}$, the identifier $ID_{package}$ of the loaded and installed operating system, and the value $V_{deriv}$ of the derivation counter 114 when the diversification takes place. If there are more than one key present in the secure element, the MSK label designating the master cryptographic key MSK used can also be sent to the server, so the latter can know which key was used.

By virtue of these elements, the server 250 is able to identify the relevant eSE 100 (by virtue of the $ID_{loader}$), perform the same master key diversification MSK as operation 328 (by virtue of the set of these parameters), and then derive the personalized data from the eSE (by virtue of the obtained derivation key and the $ID_{loader}$ and $ID_{package}$ that allow knowing the pre-personalized data 112, 124 used). These steps are illustrated in the figure under the reference 338. The database 252 is then updated (step 340).

In this way, the server 250 maintains a mirror of the state of each eSE, in its database 252, without performing any exchange of secret data.

Advantageously, the method of FIG. 3, namely, rotating/diversifying the value of the key MSK and deriving the personalized data 130, is performed at each OS installation and/or update on the secure element 100. This makes it possible to increase the security aspect with respect to this OS by uniquely assigning it a new master (derivation) key.

In one embodiment, the event 326 triggering the personalization operations (diversification of the master key MSK and then generation of the personalized data by derivation) may be decorrelated from the installation of a new OS (including an update). For example, this personalization can be triggered at any time during the life of the secure element 100, without installing or updating the OS. The event can then correspond, for illustrative purposes, to the expiration of a timeout (temporal duration), to the explicit reception of a command, to the detection of a counter or usage threshold of the current MSK, etc. The flag 116 can be reset to the state $E_1$ at the time when a new personalization is required (e.g., voluntary triggering by the mobile or banking operator) and the personalization is triggered at the next reboot (event 326) of the OS (more generally of the eSE 100).

By virtue of the invention, a secure element 100 can be soldered into an end host device 200 without an operating system. In the field, the end user requests the activation of a service that requires the installation of the OS. The administrator (network operator, bank, mobile, etc.) then triggers the loading of the OS on the secure element using the loader 110. The eSE then generates the derivation key and thereafter the installed OS generates the diversified credentials from pre-personalized credentials. The OS can now connect securely to a remote server and the user can use the enabled service. Separately, a device manufacturer may manufacture a large inventory of devices 200 integrating a secure element 100. The devices are sold, for example, in two different regions each requiring a different OS. Also, the manufacturer can have the correct OS loaded and personalized data generated post-production and from the same device inventory and to do that by region before shipping the configured devices to the appropriate regions.

Finally, during the life of the secure element 100, the current OS may become obsolete and require replacement (updating) in the field. The new OS is installed using the loader 110, which generates the derivation key. The OS can then derive personalized credential from pre-personalized data and this key. The OS can now connect securely to a telecommunications network or to a remote server.

Although the present invention has been disclosed hereinbefore with reference to specific embodiments, the present invention is not limited to these specific embodiments, and modifications, which are found within the scope of the present invention, will be obvious to a person skilled in the art.

Numerous other modifications and variations will be imposed on those persons skilled in the art by referring to the illustrative embodiments hereinbefore, which are only given by way of example, and which do not limit the scope of the invention, this only being determined by the appended claims. In particular, the different features of the different embodiments may be exchanged, where applicable.

In the claims, the word "comprising" does not exclude other elements or steps, and the indefinite article "a" or "an" does not exclude a plurality. The mere fact that different features are cited in different mutually dependent claims does not indicate that a combination of these features cannot be used advantageously.

The invention claimed is:

1. A secure element configured to be integrated into a host device and to implement services executed by an operating system that is loaded into the secure element, the secure element including an operating system loader and at least one master cryptographic key, the secure element being configured to:
   obtain, from a server, an operating system package and install the operating system; and
   in response to the installation of the operating system, causing the operating system loader to generate a derivation key by diversifying the master cryptographic key,
   wherein the master cryptographic key is stored in a secure memory and is accessible by the operating system loader only.

2. The secure element according to claim 1, wherein the operating system package comprises pre-personalization data, and
   the secure element is configured to generate personalized data by deriving the pre-personalization data with the derivation key.

3. The secure element according to claim 1, wherein the operating system loader is configured to generate the derivation key from the master cryptographic key, a unique identifier of the operating system loader, a unique identifier of the operating system package or the loaded and installed operating system, and a derivation counterupdated at each generation of the derivation key.

4. The secure element according to claim 3, further configured to, after generating the derivation key, send to a server the unique identifier of the operating system loader, the unique identifier of the operating system package or the loaded and installed operating system, the derivation counter and optionally a label designating the master cryptographic key.

5. The secure element according to claim 1, further configured to send, to the server, a request for obtaining the operating system package, the request comprising a unique identifier of the operating system loader and a unique identifier of an operating system package or a previously installed operating system if any, and
   the obtainment of the operating system package is in response to the request.

6. The secure element according to claim 1, configured to generate the derivation key in response to an operating system installation completion event.

7. The secure element according to claim 1, configured to generate the derivation key in response to a first boot of the installed operating system.

8. The secure element according to claim 1, comprising a flag set to a first non-diverse state value upon the installation of the operating system and to a second diverse state value upon the generation of the derivation key.

9. A method for personalizing a secure element configured to be integrated into a host device and to implement services executed by an operating system that is loaded into the secure element, the secure element including an operating system loader and at least one master cryptographic key, said method comprising:
   obtaining, from a server, an operating system package and installing the operating system; and
   in response to the installation of the operating system, causing the operating system loader to generate a derivation key by diversifying the master cryptographic key,
   wherein the master cryptographic key is stored in a secure memory and is accessible by the operating system loader only.

10. The method according to claim 9, further comprising:
    generating personalized data by deriving pre-personalization data stored in the secure element, with the derivation key.

* * * * *